United States Patent
Schwerdtner

(10) Patent No.: US 8,395,616 B2
(45) Date of Patent: Mar. 12, 2013

(54) METHOD FOR RENDERING AND GENERATING COMPUTER-GENERATED VIDEO HOLOGRAMS IN REAL-TIME

(75) Inventor: Alexander Schwerdtner, Dresden (DE)

(73) Assignee: SeeReal Technologies S.A., Munsbach (LU)

( * ) Notice: Subject to any disclaimer, the term of this patent is extended or adjusted under 35 U.S.C. 154(b) by 860 days.

(21) Appl. No.: 12/296,623

(22) PCT Filed: Apr. 12, 2007

(86) PCT No.: PCT/EP2007/053568
§ 371 (c)(1),
(2), (4) Date: Apr. 1, 2009

(87) PCT Pub. No.: WO2007/118842
PCT Pub. Date: Oct. 25, 2007

(65) Prior Publication Data
US 2010/0067075 A1  Mar. 18, 2010

(30) Foreign Application Priority Data
Apr. 13, 2006 (DE) .......................... 10 2006 018 689

(51) Int. Cl.
*G06T 15/00* (2011.01)

(52) U.S. Cl. ........ 345/419; 345/421; 345/426; 345/589; 345/597; 359/1; 359/9; 359/15; 359/21; 359/23; 359/29; 359/32; 359/35; 348/40; 382/154

(58) Field of Classification Search .................. 345/419, 345/421, 426, 589, 597, 420; 359/9, 15, 359/23, 29, 30, 32, 35, 1; 382/154; 348/E13.015, 348/E13.059, 40
See application file for complete search history.

(56) References Cited

U.S. PATENT DOCUMENTS

| | | | | |
|---|---|---|---|---|
| 6,123,733 | A * | 9/2000 | Dalton | 703/5 |
| 6,549,308 | B1 | 4/2003 | Camahort | |
| 6,646,773 | B2 * | 11/2003 | Garner | 359/35 |
| 6,748,347 | B1 * | 6/2004 | Dalton | 703/5 |
| 7,277,209 | B1 * | 10/2007 | Grossetie et al. | 359/9 |
| 7,605,961 | B2 * | 10/2009 | Klug et al. | 359/9 |
| 7,697,750 | B2 * | 4/2010 | Simmons | 382/154 |
| 7,738,151 | B2 * | 6/2010 | Garner et al. | 359/9 |

FOREIGN PATENT DOCUMENTS
WO   WO 2006/066906   6/2006

OTHER PUBLICATIONS

Cameron et al., "Computational challenges of emerging novel true 3D holographic displays," Proc. of SPIE, vol. 4109, pp. 129-140 (2000) XP-008000305.
Haist et al., "Computer-generated holograms from 3D-objects written on twisted-nematic liquid crystal displays," Optics Communications 140, pp. 299-308 (1997).

* cited by examiner

*Primary Examiner* — Kimbinh T Nguyen
(74) *Attorney, Agent, or Firm* — Saul Ewing LLP

(57) ABSTRACT

Method for real-time rendering and generating of computer-generated video holograms from three-dimensional image data with depth information, where the position and viewing direction of an observer defines a view of the scene, and where the observer is assigned with at least one virtual observer window, which is situated in an observer plane near the observer eyes, comprising the following process steps: 3D rendering and generation of the depth map of scene section data between two parallel section planes, which are disposed at right angles to the viewing direction of the observer, transformation of the scene section data, repetition of the steps of 3D rendering and transformation, Back-transformation, encoding in pixel values in order to reconstruct the three-dimensional scene.

7 Claims, 3 Drawing Sheets

METHOD FOR RENDERING AND GENERATING COMPUTER-GENERATED VIDEO HOLOGRAMS IN REAL-TIME

CROSS REFERENCE TO RELATED APPLICATIONS

This application claims the priority of PCT/EP2007/053568, filed on Apr. 12, 2007, which claims priority to DE 10 2006 018 689.3, filed Apr. 13, 2006, the entire contents of which are hereby incorporated in total by reference.

FIELD OF THE INVENTION

The invention relates to a method for real-time rendering and generating of computer-generated video holograms (CGVH) from three-dimensional image data with depth information. As regards the rendering process, the invention relates to the 3D rendering pipeline or graphics pipeline, which describes the algorithms from the vectorial, mathematical description of a three-dimensional scene to the pixelated image on the monitor screen. The three-dimensional image data comprises depth information and usually also additional information about material and surface properties. As regards the generation of holographic data, the invention relates to the transformation of sub-sections of a scene, wherein the transformation describes the propagation of light waves. During the holographic reconstruction of the three-dimensional objects or three-dimensional scenes, the light wave front is generated through interference and superimposition of coherent light waves.

In contrast to classic holograms, which are stored photographically or in another suitable way in the form of interference patterns, CGVH exist as the result of a computation of hologram data from sequences of a three-dimensional scene and are stored in electronic means. Modulated light which is capable of generating interference propagates in the space in front of the eyes of an observer in the form of a light wave front which has controllable amplitude and phase values, said light wave front thereby reconstructing a three-dimensional scene. Controlling a spatial light modulator SLM with the hologram values of the video holograms causes the wave field, which is modulated in pixels and emitted from the display screen, to reconstruct the three-dimensional scene as desired by generating interference in the reconstruction space.

A holographic display device typically comprises an arrangement of controllable pixels which reconstruct object points by electronically influencing the amplitude and/or phase of illuminating light. Such an arrangement forms a spatial light modulator (SLM) or, more generally, a light modulator means. The display device may alternatively be of a continuous type instead of a matrix type. For example, it may be a continuous SLM, including a continuous SLM with matrix control or an acousto-optic modulator (AOM). A liquid crystal display (LCD) serves as an example of such a suitable display device for the reconstruction of video holograms by way of spatial amplitude modulation of a light pattern. However, this invention can also be applied to other controllable devices which use coherent light for modulating a light wave front.

In this document, the term 'pixel' denotes a controllable hologram pixel in the SLM; a pixel is individually addressed and controlled by a discrete value of a hologram point. Each pixel represents a hologram point of the video hologram. In an LCD, the term 'pixel' is therefore used for the individually addressable image points of the display screen. In digital light processing (DLP) technology, the term 'pixel' is used for an individual micro-mirror or a small group of micro-mirrors. In a continuous SLM, a 'pixel' is the transitional region on the SLM which represents a complex hologram point. The term 'pixel' thus generally denotes the smallest unit which is able to represent or display a complex hologram point.

TECHNICAL BACKGROUND OF THE INVENTION

Computer-generated video holograms can, for example, be reconstructed using a holographic display device as already described by the applicant in document WO 2004/044659. The observer looks towards the display screen through at least one virtual observer window, which is greater in size than an eye pupil.

An 'observer window' is a limited virtual region through which the observer can watch the entire reconstruction of the three-dimensional scene at sufficient visibility. The observer window is situated on or near the observer eyes. The observer window can be displaced in the x, y and z directions. Within the observer window, the wave fields interfere such that the reconstructed object becomes visible for the observer. The windows are situated near the observer eyes and can be tracked to the actual observer position with the help of known position detection and tracking systems. They can therefore preferably be limited to a size which is only a little larger than the size of the eye pupils. It is possible to use two observer windows, one for each eye. Generally, more complex arrangements of observer windows are possible as well. It is further possible to encode video holograms which contain objects or entire scenes which appear behind the SLM for the observer.

The term 'transformation' shall be construed to include any mathematical or computational technique which is identical to or which approximates a transformation. Transformations in a mathematical sense are merely approximations of physical processes, which are described more precisely by the Maxwellian wave equations. Transformations such as Fresnel transformations or the special group of transformations which are known as Fourier transformations, describe second-order approximations. Transformations are usually represented by algebraic and non-differential equations and can therefore be handled efficiently and at high performance using known computing means. Moreover, they can be used precisely in optical systems.

Document WO 2006/066919 A1 filed by the applicant describes a method for computing computer-generated video holograms. According to that method, objects with complex amplitude values of a three-dimensional scene are assigned to matrix dots of parallel virtual section layers such that for each section layer an individual object data set is defined with discrete amplitude values in matrix dots, and a holographic code for a light modulator matrix of a holographic display device is computed from the image data sets.

According to this invention, the solution of the object takes advantage of the general idea that the following steps are carried out aided by a computer:

A diffraction image is computed in the form of a separate two-dimensional distribution of wave fields for an observer plane, which is situated at a finite distance and parallel to the section layers, from each object data set of each tomographic scene section, where the wave fields of all sections are computed for at least one common virtual observer window, the observer window, which is situated in the observer plane near the eyes of an observer, the area of said observer window being smaller than the video hologram;

The computed distributions of all section layers are added to define an aggregated wave field for the observer window in a data set which is referenced in relation to the observer plane;

The reference data set is transformed into a hologram plane, which is situated at a finite distance and parallel to the reference plane, to create a hologram data set for an aggregated computer-generated hologram of the scene, where the light modulator matrix is situated in the hologram plane, and where the scene is reconstructed in the space in front of the eyes of the observer with the help of said light modulator matrix after encoding.

The above-mentioned methods and holographic display devices are based on the idea not to reconstruct the object of the scene itself, but preferably to reconstruct in one or multiple observer windows the wave front which would be emitted by the object.

The observer can watch the scene through the virtual observer windows. The virtual observer windows can be tracked to the actual observer position with the help of known position detection and tracking systems. A virtual, frustum-shaped reconstruction space stretches between the light modulator means of the holographic display device and the observer windows, where the SLM represents the base and the observer window the top of the frustum. If the observer windows are very small, the frustum can be approximated as a pyramid. The observer looks though the virtual observer windows towards the display and receives in the observer window the wave front which represents the scene.

OBJECT OF THE INVENTION

It is an object of the invention to provide a method for real-time generation of video holograms from three-dimensional image data with depth information. In particular, graphics processors and graphics sub-systems which are commercially available today, e.g. as used in graphics cards and games consoles, may be used. Established industrial standards as regards hardware, software and programme interfaces may be used without thereby restricting generality.

SUMMARY OF THE INVENTION

The general idea of the inventive method will be explained below, with additional details provided in subsequent paragraphs. The method is based on three-dimensional image data with depth information. This information is available for example as a three-dimensional description in the form of vertices, normal vectors and matrices. The image data usually contain additional information about material and surface properties etc.

In real-time rendering, a 3D rendering pipeline or graphics pipeline describes the way from the vectorial, mathematical description of a three-dimensional scene to the pixelated image data in a frame buffer in order to be displayed on a monitor screen. For example, the conversion of screen coordinates into device coordinates, texturing, clipping and anti-aliasing are performed in the pipeline. The pixelated image, which represents a two-dimensional projection of the three-dimensional scene, and which is stored in the frame buffer of a graphics adapter, contains the pixel values for the controllable pixels of a monitor screen, for example an LC display.

In order to achieve a holographic representation, light which is capable of generating interference is phase- and/or amplitude-modulated, and a three-dimensional scene is reconstructed with the help of interference patterns generated by superimposed light waves.

This graphics pipeline is also used in a first process step of generating the video holograms from three-dimensional image data with depth information. Then, the generation of holographic data is based on a transformation of the scene, where the transformation describes the propagation of the light waves. After a back-transformation, the encoding process is carried out, where complex hologram values are transformed into pixel values for the one or multiple light modulator means of the holographic display device.

The invention is based on the idea that the 3D rendering process on the one hand and the holographic transformation and back-transformation and the encoding process on the other hand are not executed separately on a graphics processor and on an arithmetic processor, but that the two process groups are executed on one or multiple graphics processors. The entire execution of all process steps is performed on the graphics sub-system, which mainly comprises the major components of graphics processor, storage media and interfaces. According to the invention, this preferably aims to take advantage of the higher performance of graphics processors which are commercially available today, compared with arithmetic processors. Further, complicated data transfers between the graphics sub-system and other external interfaces can be omitted.

Now, the above-mentioned process steps will be described in detail below. A view of a three-dimensional scene is defined by the position and viewing direction of an observer. The observer is assigned with at least one virtual observer window which lies near the observer eyes in a reference plane.

The image data are available in the form of a three-dimensional description with depth information. Typically, both the colour of the objects and their surface texture are defined. Further, properties of the material and light sources are modelled or generated with the help of auxiliary algorithms.

In a preparatory step, the scene is rotated, sized and translated according to the observer's viewing direction, and the visibility of the scene is calculated. Then, all required information about type and distribution of light are calculated with the help of an illumination model. This aims to ensure that in the subsequent steps of generating holographic data the coordinates and lighting details do not have to be computed repeatedly. Those computations are rather complicated and would adversely affect the performance of the entire system in the case of complex scenes.

A first process step comprises the 3D rendering and the generation of the depth map. The scene data are then sliced into section layers by two parallel section planes. These planes are situated at right angles to the observer's viewing direction, and the distance between the section planes is chosen to be small enough to ensure both a sufficient precision of the calculation results but also a good process performance. Ideally, the distance should be very small, so that only the depth information which is at a constant distance to the observer must be considered during the calculations. If the distance between the planes is greater, the depth information shall be chosen such that for example an average distance between the two planes is defined and assigned to a certain layer. The scene section data of a layer are now rendered and the depth map is generated.

In a subsequent process step, the scene section data are transformed. Generally, a transformation describes the propagation of the light waves to the virtual observer window. The most simple transformations are Fourier transformations and Fresnel transformations. The Fourier transformation is preferably used in the far field, where due to the large distance to the observer the light waves can be interpreted as a plane wave front. In contrast to other transformations, the Fourier transformation exhibits the advantage that the transformation can be modelled with the help of optical elements—and vice versa. In the near field described by a spherical wave, a Fresnel transformation is preferably used. The transformations are based on constant z coordinates which are implied by the section layers. For example, the z coordinate of one of the two planes or the average z coordinate of those two planes is used.

The above-mentioned steps of 3D rendering and transforming are subsequently repeated, thereby successively displacing the section planes in the viewing direction, until the entire scene is transformed. The transformed data of the scene section data are successively added to form an aggregated reference data set. After transformation of the entire scene, this reference data set represents the sum of the transformations of the individual scene section data.

In a subsequent process step, a back-transformation is performed, where the reference data are transformed into a hologram plane which coincides with the position of a light modulator means, and which is situated at a final distance and parallel to the reference plane, to generate hologram data for the video hologram.

In a last process step, the encoding process is performed, where after a normalisation the transformation into pixel values is performed. If the Burckhardt encoding method is used, the complex hologram value is represented by three values which are normalised in a range between 0 and 1, where the value represented by 1 forms the maximum achievable component value. These values are then converted into discrete values, and they represent in the form of discretised greyscale values the control intensities for the pixels of the light modulator means. The number of discretisation steps depends on both the characteristics of the graphics card and the display panel used. They usually have a resolution of 8 bits and 256 greyscale steps. Other resolutions, e.g. 10 bit and more, are possible. Another preferred encoding method is the two-phase encoding method.

According to a special embodiment of the method, if an encoding method is chosen which does not allow an analytic, but only an iterative solution to be used, the steps from 3D rendering to encoding are repeated until the optimum solution, which is characterised by minimum signal noise, is sufficiently approximated.

The encoded pixel values are now transferred in a frame buffer to the light modulator, where light which is capable of generating interference is phase- and/or amplitude-modulated, and a three-dimensional scene is reconstructed with the help of interference patterns generated by superimposed light waves.

If colour image contents are to be generated, the method is applied analogously for each colour component. In order to represent the video hologram, each pixel may be composed of sub-pixels for each of the three primary colours for the representation or display of coloured hologram points. Depending on the kind of video hologram encoding, further sub-pixels may be used to represent the primary colours of each coloured hologram point.

The inventive method thus provides the basis for a real-time generation of video holograms from three-dimensional image data with depth information on graphics processors and graphics sub-systems which are commercially available today, as used in graphics cards or games consoles.

PREFERRED EMBODIMENTS OF THE INVENTION

Further aspects and details of the invention will be explained below with the help of embodiments and accompanying drawings.

Figure 1:
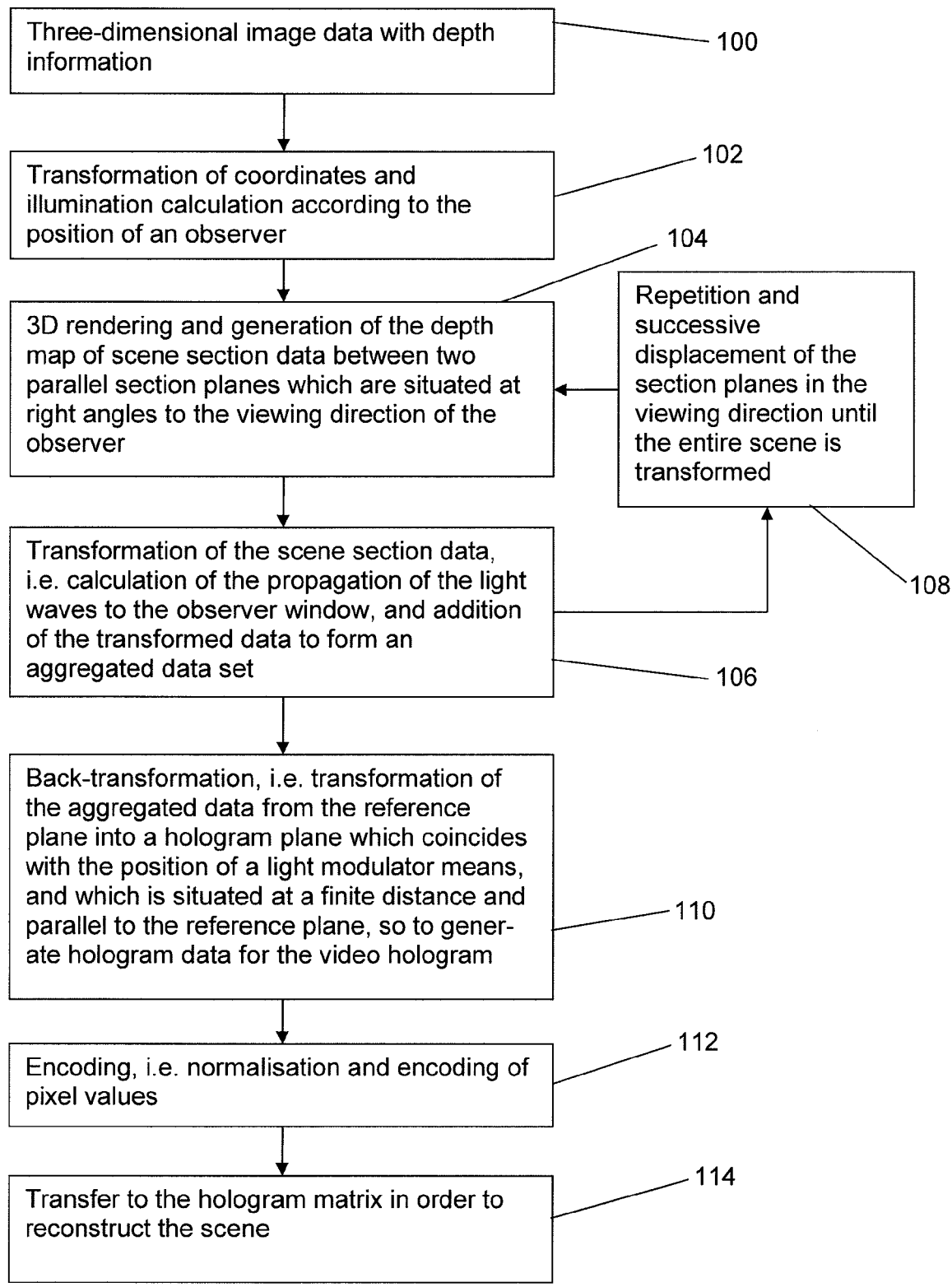
FIG. 1 shows a flowchart of the method.

FIG. 1 shows a flowchart of the method. The method is based on three-dimensional image data with depth information 100. A view of a scene is defined by the position and viewing direction of an observer. An observer is assigned with at least one virtual observer window which lies near the observer eyes in a reference plane.

In a preparatory process step 102, the scene coordinates are transformed and a scene illumination calculation is carried out considering the viewing direction of the observer. If necessary, further steps may be executed here in order to improve the scene representation quality. These steps, and all subsequent steps, are executed on the graphics sub-system.

The first step 104 comprises the 3D rendering and the generation of the depth map of scene section data between two parallel section planes, which are disposed at right angles to the viewing direction of the observer. The scene section data are then transformed 106, i.e. the propagation of the light waves to the virtual observer window in the reference plane is calculated. The transformed scene section data are added to form an aggregated data set. A Fourier transformation is used in this embodiment, which is implemented numerically with the help of the fast Fourier transformation algorithm. The major numeric operations needed to execute this transformation, i.e. mainly multiplication and addition, repetitions and conditional commands, and combinations thereof, are implemented on a programmable shader and performed by the same.

The steps of 3D rendering and transforming 104, 106 are now repeated 108, while successively displacing the section planes in the viewing direction, until the entire scene is transformed. Thereafter, the scene is back-transformed 110, here also using the Fourier transformation algorithm. The inverse transformation is implemented on the programmable shader and performed by the same, like the original transformation. During the back-transformation 110, the aggregated data are transformed from the reference plane into a hologram plane, which coincides with the position of a light modulator means, and which is situated at a finite distance and parallel to the reference plane, so to generate hologram data for the video hologram.

Finally, the scene is encoded 112, where after a normalisation step the pixel values are calculated and transferred in a frame buffer to the light modulator means in order to reconstruct the three-dimensional scene 114. These simple arithmetic operations, compared with a transformation, are in a most simple case also implemented on the programmable shader and performed by the same.

Figure 2:
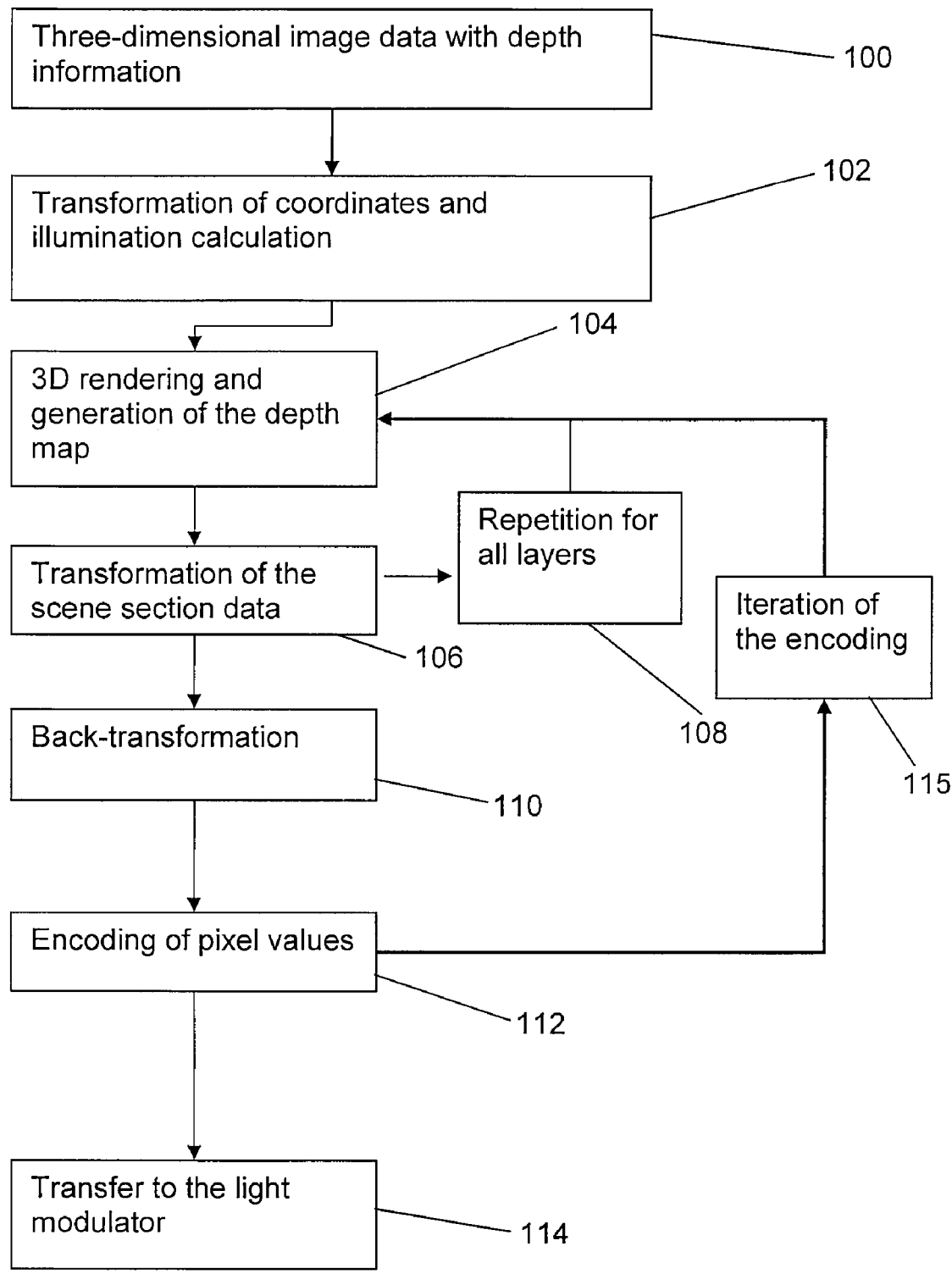
FIG. 2 shows a flowchart of the method for the special case of an iterative solution.

FIG. 2 shows a flowchart of the method for the special case of an iterative solution. The major steps of computing the scene visibility and illumination 102, 3D rendering and generation of the depth map 104, transformation of the aggregated transformed scene section data 106, back-transformation 110, and encoding 112 are designed and implemented as described in the first embodiment. This embodiment is based on the thought that the encoding of the pixel values cannot be calculated analytically. The steps from 3D rendering to encoding are therefore executed iteratively. The calculated encoded pixel values, i.e. phase and/or amplitude, are therein used as initial values for the transformation and back-transformation of the subsequent iteration step 115. The iteration is repeated until the optimum solution, which is characterised by minimum signal noise, is sufficiently approximated. Other stopping criteria or definitions of the optimum solution may be employed considering the type of transformation and numeric algorithms used.

Figure 3:
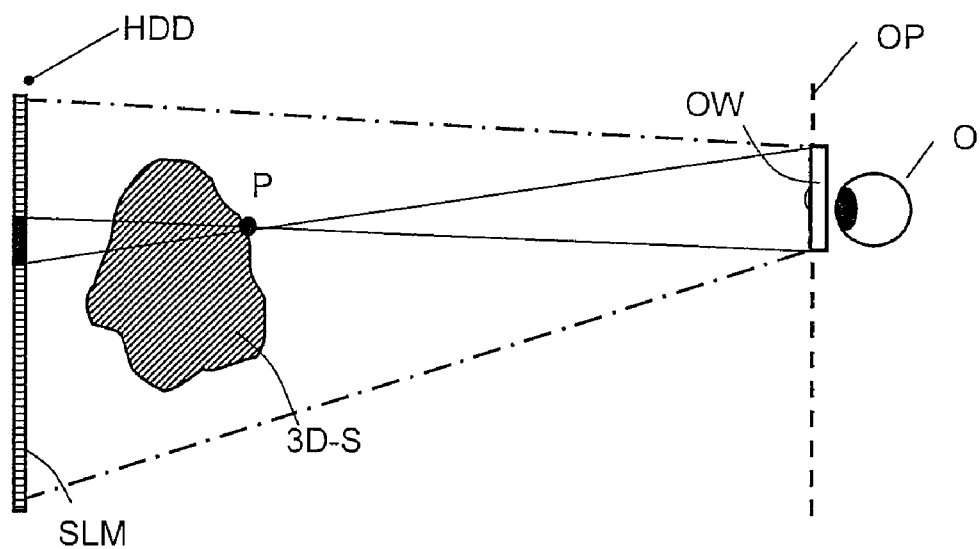
FIG. 3 illustrates the general principle of a preferred holographic display device (HDD), which is used to display the video holograms generated according to the inventive method.

FIG. 3 illustrates the general principle of a preferred holographic display device (HDD), which is used to display the video holograms generated according to the inventive method. An observer, represented by his or her observer eye or eyes (O), looks through virtual observer windows (OW) on to a holographic display device (HDD). The device comprises spatial light modulator means (SLM). Such a holographic display device is based on the principle to reconstruct the wave front that would be emitted by an object in a three-dimensional scene (3D-S) into one or multiple virtual observer windows (OW) in the observer plane (OP).

The invention claimed is:

1. A method for real-time rendering and generating of computer-generated video holograms from three-dimensional image data with depth information, for a holographic display device, which comprises light modulator means, and which reconstructs only the wave front emitted by an object directed to an observer eye or eyes, where the position and viewing direction of an observer defines a view of the three-dimensional scene and where the observer is assigned at least one virtual observer window, which is situated in an observer plane near the observer eye or eyes, and where in a preparatory process step the scene coordinates are transformed and scene illumination calculations are carried out considering the viewing direction of the observer, comprising the following process steps:

3D rendering and generation of the depth map of scene section data between two parallel section planes, which are disposed at right angles to the viewing direction of the observer, transformation of the scene section data by calculating the propagation of the light waves to the observer window, repetition of the steps of 3D rendering and transforming, while successively displacing the section planes in the viewing direction, until the entire scene is transformed, and addition of the results of the individual transformations, back-transformation, where aggregated data are transformed from the observer plane into a hologram plane which coincides with the position of a light modulator means, and which is situated at a finite distance and parallel to the observer plane, so as to generate hologram data for the video hologram, encoding, where after a normalisation step the pixel values are calculated and transferred in a frame buffer in order to reconstruct the three-dimensional scene, where the individual process steps are executed on a graphics subsystem by one or multiple graphics processors.

2. The method according to claim 1, where the process steps of 3D rendering, transformation, back-transformation and encoding are implemented on a programmable standardised shader and are executed on the same.

3. The method according to claim 1, where the transformation describes the propagation of the light waves into the observer window by way of Fourier or Fresnel transformation.

4. The method according to claim 1, where the 3D rendering and transformation processes are only performed for outlines of the scene.

5. The method according to claim 1, where for colour representation the method is applied to each primary colour.

6. The method according to claim 1, where the transformation into the observer plane is based on a constant distance between the scene section data and the observer plane, the constant distance being implied on the section planes.

7. The method according to claim 1 for an iterative solution of the transformation and encoding process, where the rendering, transformation, and repetition steps are repeated until the optimum solution, which is characterised by minimum signal noise, is sufficiently approximated.

* * * * *